(12) United States Patent
Smirnov

(10) Patent No.: US 8,671,973 B2
(45) Date of Patent: Mar. 18, 2014

(54) MASS FLOW CONTROLLER HYSTERESIS COMPENSATION SYSTEM AND METHOD

(75) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 1226 days.

(21) Appl. No.: 12/356,661

(22) Filed: Jan. 21, 2009

(65) Prior Publication Data

US 2010/0180951 A1 Jul. 22, 2010

(51) Int. Cl.
- F16K 31/36 (2006.01)
- G05B 13/02 (2006.01)
- G05D 7/00 (2006.01)
- G05D 11/00 (2006.01)

(52) U.S. Cl.
USPC .......................... 137/487.5; 700/44; 700/282

(58) Field of Classification Search
USPC .................... 137/487.5; 251/129.01, 129.04; 700/301, 44, 45, 282
See application file for complete search history.

(56) References Cited

U.S. PATENT DOCUMENTS

| 5,541,576 | A | | 7/1996 | Knutson | |
|---|---|---|---|---|---|
| 5,911,238 | A | * | 6/1999 | Bump et al. | 137/487.5 |
| 2006/0190099 | A1 | | 8/2006 | Nangoy et al. | |
| 2006/0201488 | A1 | | 9/2006 | Kohler et al. | |

FOREIGN PATENT DOCUMENTS

| JP | 2002310329 | 10/2002 |
|---|---|---|
| JP | 2009150364 | 7/2009 |
| WO | WO2004046840 A1 | 6/2004 |

OTHER PUBLICATIONS

Jack L. Johnson, P.E., "Hydraulic Valves", "Hydraulics & Pneumatics magazine", Dec. 31, 2007, Publisher: Penton Media, Inc., Published in: US.

Tuohy, Ben, "International Search Report re Application No. PCT/US10/021493", May 20, 2010, Published in: PCT.

Becamel, Philippe, "International Preliminary Report on Patentability re Application No. PCT/US10/021493", Aug. 4, 2011, p. 11 Published in: CH.

* cited by examiner

*Primary Examiner* — Len Tran
*Assistant Examiner* — Chee-Chong Lee
(74) *Attorney, Agent, or Firm* — Neugeboren O'Dowd PC

(57) ABSTRACT

A method of characterizing hysteresis as a function of a device output comprising, applying an input signal across a first input signal range to a device, the input signal inducing a device function having a first output with a first output value range dependent upon the first input signal range. The input signal is further applied across a second input signal range to the device, the input signal inducing the device function to have a second output with a second output value range dependent upon (i) the second input signal range and (ii) device hysteresis. A difference between the second input signal range and the first input signal range is then measured across the first and second output value ranges. A method of operating a mass flow controller valve and a mass flow controller are also contemplated.

4 Claims, 9 Drawing Sheets

MASS FLOW CONTROLLER HYSTERESIS COMPENSATION SYSTEM AND METHOD

FIELD OF THE INVENTION

The present invention generally relates to a device exhibiting hysteresis. In particular, but not by way of limitation, the present invention relates to mass flow controller valve-hysteresis-characterization and compensation methods and systems.

BACKGROUND OF THE INVENTION

Many mass flow controllers (MFC) control the flow rate of a gas flowing through the controller using a flow sensor. One type of flow sensor measures the actual flow rate of the gas flowing through the controller and based on a difference between the actual flow rate (as measured by the flow sensor) and a desired flow rate (as set by a user), a control signal is sent to a MFC valve. The MFC valve may receive the control signal and adjust the valve to increase or decrease the flow rate in order for the actual flow rate to more closely equal the desired flow rate.

At times, it is necessary to quickly change the control signal provided to the valve due to quickly changing flow conditions. For example, it may be necessary to rapidly adjust the valve displacement during a period of rapidly changing gas pressure or to adjust the valve displacement when it is necessary to quickly change the flow rate of the gas flowing through the MFC. During a period where a rapid change of the valve displacement is required, the flow sensor may be unable to provide the data necessary to accurately adjust the flow rate.

In order to more accurately adjust the valve during periods of rapidly changing flow conditions, an MFC feed-forward-mode may be implemented. During a feed-forward-mode, a signal may be emitted from a MFC pressure sensor to the valve. The valve may utilize the pressure sensor signal, or a modified version of the signal, to adjust the gas flow rate.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

One embodiment of the invention comprises a method of characterizing hysteresis as a function of a device output in a device such as, but not limited to, a mass flow controller valve. One method of characterizing hysteresis in a device is comprised of applying an input signal across a first input signal range to the device. The input signal induces a device function, the device function having a first output with a first output value range that is dependent upon the first input signal range. The method thereinafter includes applying the input signal to the device across a second input signal range. The input signal induces the device function, the device function having a second output with a second output value range. The second output value range is dependent upon the second input signal range and device hysteresis. Finally, a difference between the second input signal range and the first input signal range is measured across the first and second output value ranges.

Another embodiment of the invention comprises a method of operating a mass flow controller valve. One method of operating a mass flow controller valve comprises sequentially applying a plurality of voltages to the valve. The plurality of voltages applied to the valve are adapted to adjust the valve in order to obtain one or more desired mass flow rates through the mass flow controller. At least one of the plurality of voltages comprises an adjusted voltage. The adjusted voltage is comprised of the sum of a specified ascending voltage and at least one hysteresis adjustment voltage for a desired gas flow rate.

Yet another embodiment of the invention comprises a mass flow controller. One embodiment of a mass flow controller comprises a gas flow line, a hysteretic control valve, and a control module. The control valve is adapted to control a flow rate of a gas flowing through the gas flow line. The control module in one embodiment is adapted to emit a final control signal to the control valve. The control valve is adapted to utilize the signal in adjusting the valve so a gas may flow through the gas flow line at the desired mass flow rate. Furthermore, the final control signal sent to the valve may be adapted to compensate for any hysteresis effect shown by the valve.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
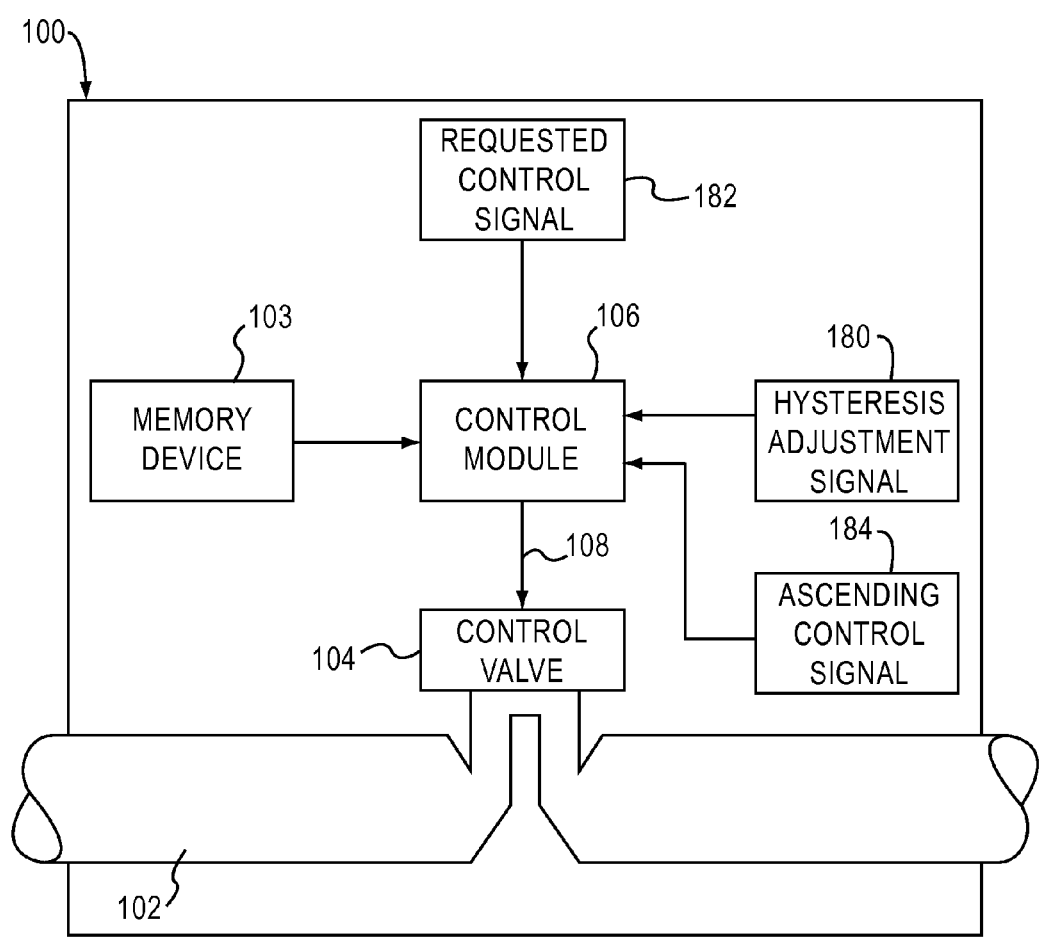
FIG. 1 is a functional block diagram of a portion of a mass flow controller in accordance with an illustrative embodiment of the invention.

Referring now to the drawings, where like or similar elements are designated with identical reference numerals throughout the several views where appropriate, and referring in particular to FIG. 1, shown is a functional block diagram of a portion of a mass flow controller (MFC) 100 in accordance with an illustrative embodiment of the invention. The portion of the mass flow controller 100 shown in FIG. 1 comprises a main flow line 102, a control valve 104, a control module 106 and a memory device 103.

The illustrated arrangement of these components is logical and not meant to be an actual hardware diagram. Thus, the components can be combined or further separated in an actual implementation. For example, the memory device 103 may be included in the control module 106 in one embodiment. Moreover, the construction of each individual component, in light of this specification, is well-known to those of skill in the art, and as discussed further herein, may include hardware, software, firmware or a combination thereof.

The control valve 104 may be referred to as a device throughout this application. Furthermore, the control valve 104 is adapted to adjust a flow rate of a gas flowing through the main flow line 102. One embodiment of control valve 104 is a piezoelectric actuator. The control module 106 in one embodiment is adapted to provide a final control signal 108 to the control valve 104. It is to be appreciated that the final control signal 108 may be modified by a digital signal processor (not shown) or other signal modifier prior to being received by the control valve 104. In some embodiments, the control module 106 may include the digital signal processor or other signal modifier. The control valve 104 in one embodiment is adapted to utilize the final control signal 108 in order to adjust the valve 104 and regulate the gas flow rate through the main flow line 102.

It is contemplated that the final control signal 108 may be generated by a mechanism other than the control module 106. For example, the final control signal 108 may be generated by a signal generator (not shown) adapted to provide a known signal level. A signal generator may be used to properly characterize hysteresis exhibited by the mass flow controller valve 104. In an embodiment comprising a signal generator, or in other embodiments, the final control signal 108 may be referred to as the input signal. One final control signal 108 may be comprised of a voltage. However, other signals such as, but not limited to, an electrical current may comprise the final control signal 108.

Figure 2A:
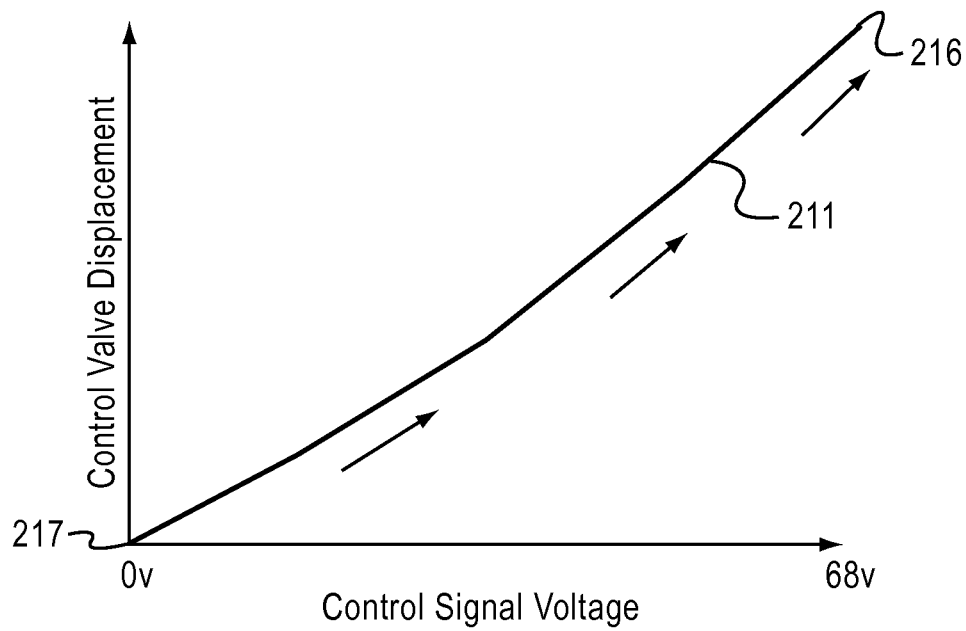
FIG. 2A is a graph displaying one example of a control valve displacement range corresponding to a first input signal range in accordance with an illustrative embodiment of the invention.

In one embodiment, and as shown in FIG. 2A, one input signal applied to the control valve 104 may be a control signal voltage applied across a first input signal range 211. One embodiment's first input signal range 211 may comprise a sequentially increasing control signal voltage. A first input signal range 211 may comprise a 68 volt range, with a first input signal range start voltage 217 of about 0 volts and a first input signal range end voltage of about 68 volts. The first input signal range end voltage may also be referred to as a first turning point 216.

One first input signal range 211 may be applied in a series of step increases in voltage level. For example, voltage may be applied from 0 to 68 volts in 1 volt increments. It is also contemplated to increase the voltage in step increases as a percentage of a known maximum voltage, wherein the maximum voltage corresponds to a maximum flow rate of a gas through the MFC. For example, the voltage may be increased in 1% or 2% steps; however, larger or smaller increments are contemplated. Furthermore, larger or smaller first input signal ranges 211 are contemplated, as are differing start voltages 217 and first turning points 216. In one method, the first turning point 216 comprises a voltage adapted to produce a gas flow rate less than a maximum gas flow rate through the main flow line 102.

Applying an input signal such as, but not limited to, the control signal voltage, to a control valve 104, may cause the control valve 104 to perform a function. For example, as shown in FIG. 2A, the input signal may induce a device function such as causing a change in control valve displacement. Other functions known in the art are also contemplated. As further shown in FIG. 2A, the control valve displacement may be substantially proportional to the control signal voltage.

Figure 2B:
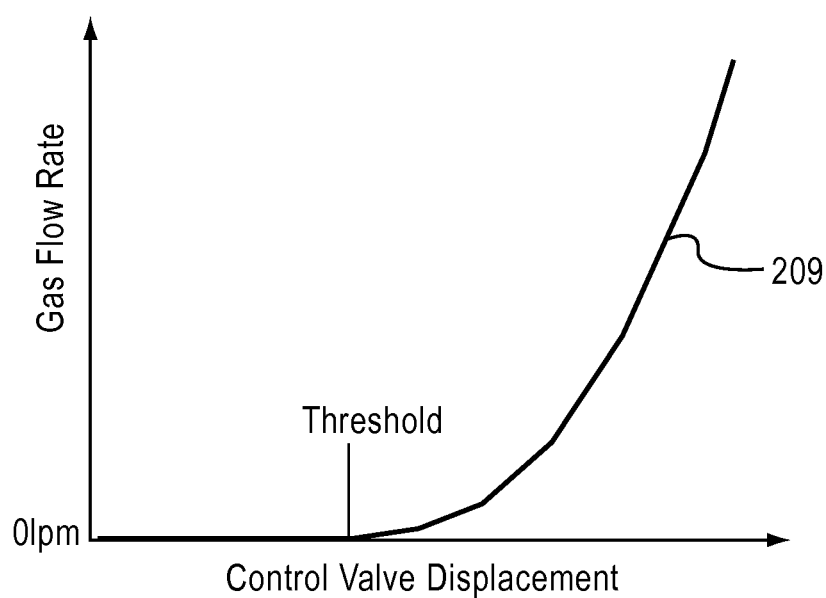
FIG. 2B is a graph displaying one example of a gas flow rate corresponding to the control valve displacement in accordance with an illustrative embodiment of the invention.

Valve displacement in one embodiment may be correlated to a first output having a first output value range 209, shown in FIG. 2B. For example, increasing the valve displacement may increase a flow area in the main flow line 102 for gas to flow through. This increased flow area therefore allows for an increased gas flow rate. Gas flow rate may comprise an output value in at least one embodiment. Shown in FIG. 2B is the relation between an increasing control valve displacement and the gas flow rate for one embodiment. In one embodiment, the gas flow rate is measured for each control valve displacement through the use of a flow sensor (not shown). As depicted, one flow sensor may measure the gas flow rate in liters per minute (lpm), but other units for gas flow rates are contemplated.

The gas flow rate of one embodiment is about zero lpm when the control valve displacement is below some displacement threshold, as seen in FIG. 2B. Above the threshold, the gas flow rate increases as control valve displacement increases, however, not linearly due to gas flow dynamics properties. Therefore, as seen in FIGS. 2A & 2B, applying the control signal voltage across the first input signal range 211 may induce a gas flow rate first output.

Figure 3A:
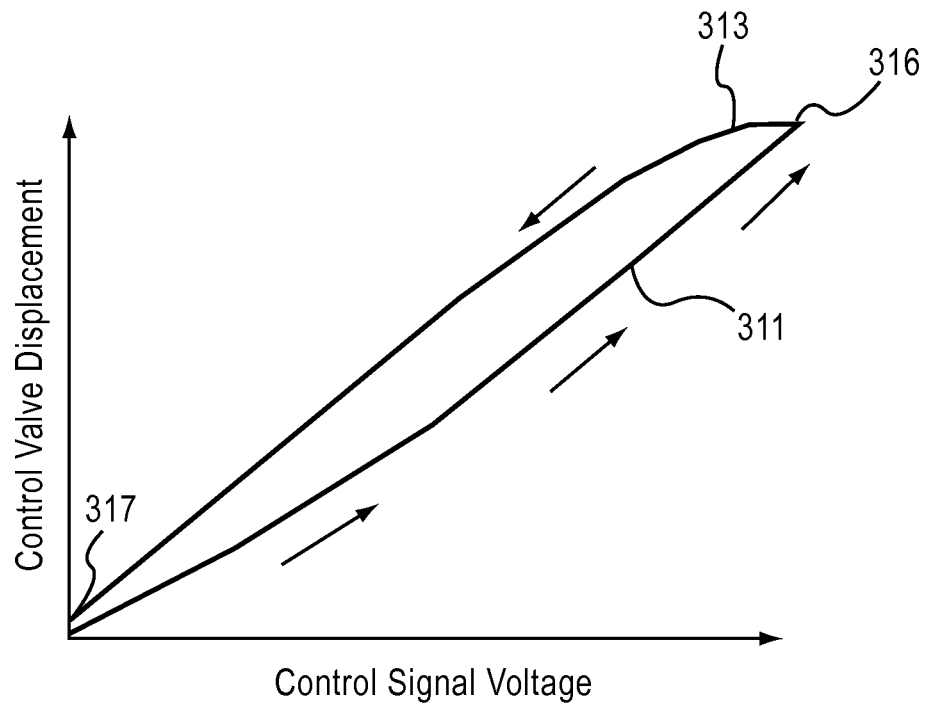
FIG. 3A is a graph displaying the control valve displacement corresponding to a first input signal range and a second input signal range in accordance with an illustrative embodiment of the invention.

As shown in FIG. 3A, upon reaching the turning point 316, the control signal voltage may be applied across a second input signal range 313. In one embodiment, the second input signal range 313 may be a sequentially decreasing voltage. Like the first input signal range 311, the second input signal range 313 may cause the control valve 104 to perform a function (such as, but not limited to, adjusting the control valve displacement). As shown in FIG. 3A, the valve displacement across the second input signal range 313 may be generally proportional to the voltage applied. However, as is also shown in FIG. 3A, after the control signal voltage is increased, reaches the turning point 316, and is subsequently decreased, the control valve displacement across the second input signal range 313 is greater than the valve displacement across the first input signal range 311 for similar voltages.

In one embodiment, a second input signal range 313 may have a start voltage which comprises the turning point 316 and the second input signal range 313 may have a final voltage comprising the first input signal range start voltage 317. Similar to the first input signal range 311, the second input signal range 313 may comprise a series of step voltages applied to the control valve 104, although the step voltages across the second input signal range 313 may comprise decreasing step voltages. In one embodiment, the decreasing step voltages may equal the decreasing step voltages. So, if a 1 volt step was applied during the increasing voltage range, a similar step may be applied during the decreasing voltage range.

Figure 3B:
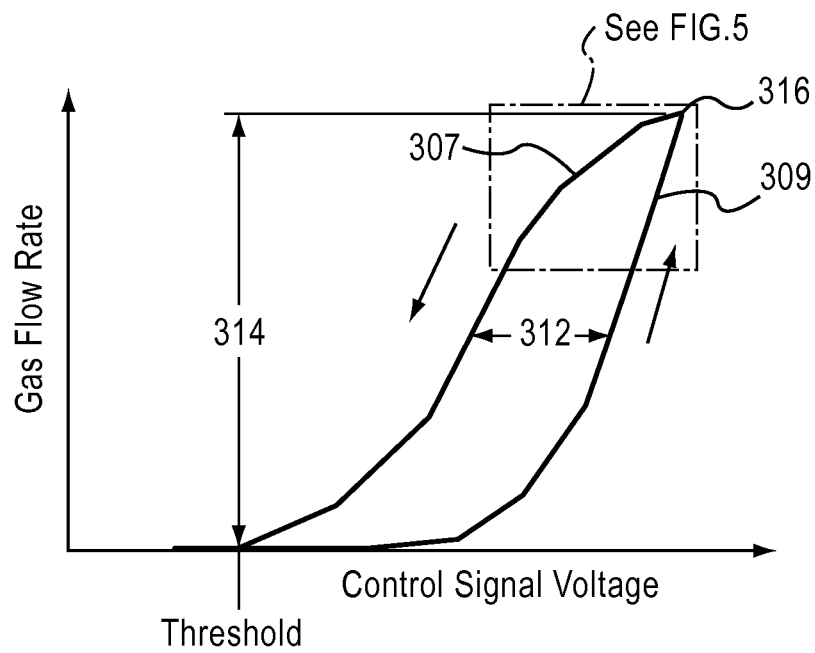
FIG. 3B is a graph displaying the gas flow rate corresponding to first and second input signal ranges in accordance with an illustrative embodiment of the invention.

When control valve displacement is correlated to a gas flow rate along the second input signal range 313, a gas-flow-rate second-output having a second output value range 307 is produced. One gas flow rate second output value range 307 is greater than the gas flow rate first output value range 309 for similar voltage, due to hysteresis, as shown in FIG. 3B. A difference 312 between the input values may be measured across the entire first and second gas flow rate output ranges 314. The difference 312 may also be referred to as a hysteresis adjustment voltage.

Figure 4:
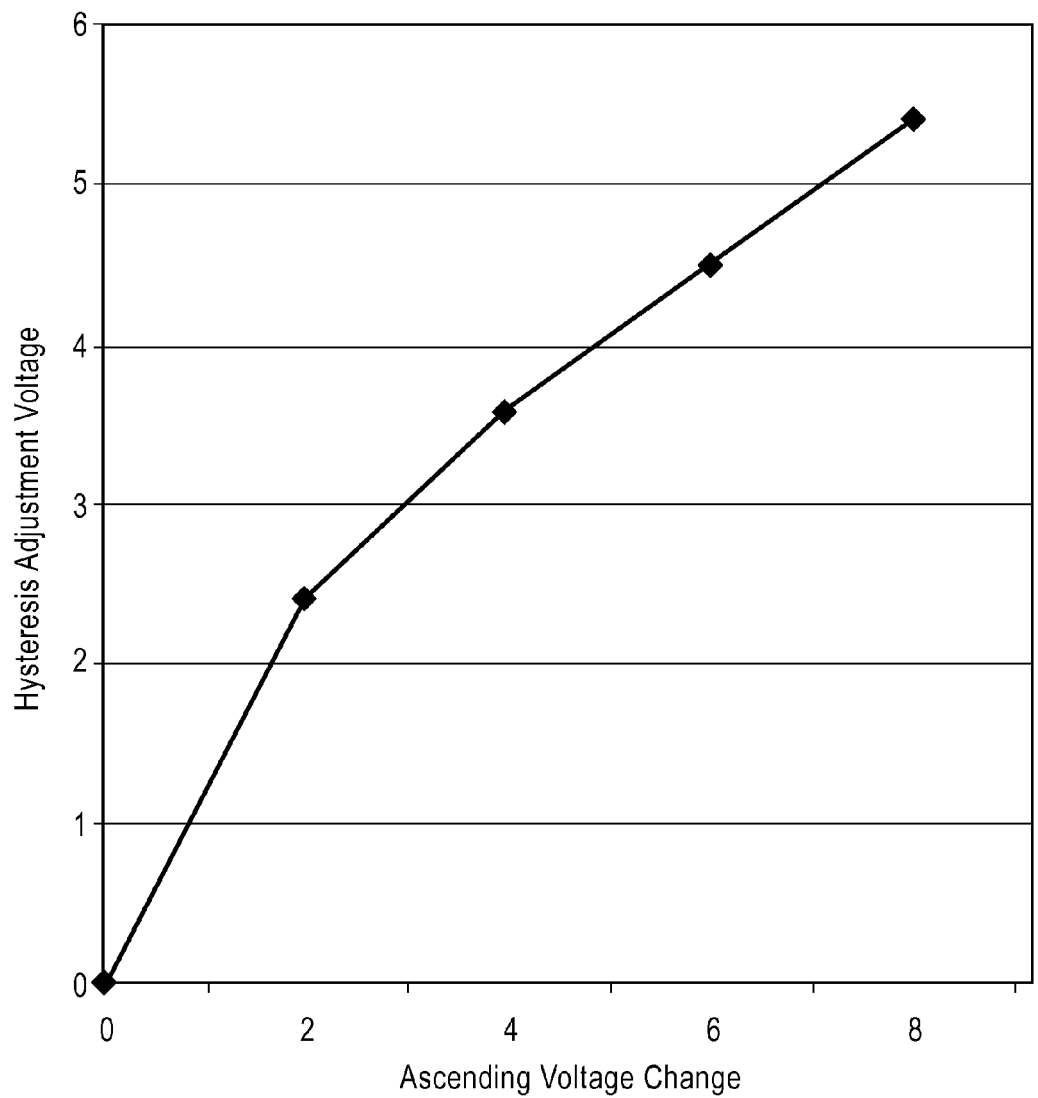
FIG. 4 is a graph showing the hysteresis adjustment voltage as a function of ascending voltage change in accordance with an illustrative embodiment of the invention.

As shown in FIG. 4, the input signal range difference 312 increases as the absolute value change in control signal voltage increases from the first turning point 316 to the threshold. In one embodiment, the series of step voltages applied across the first input signal range 311, the measured valve displacement for each first input signal range voltage applied, and the corresponding measured gas flow rate for each valve displacement are stored in the memory device 103, as shown in FIG. 1. Furthermore, the series of voltages applied across the second input signal range 313, the measured valve displacement for each second input signal range voltage applied, and the corresponding measured gas flow rate for each valve displacement are also stored in the memory device 103.

Figure 5:
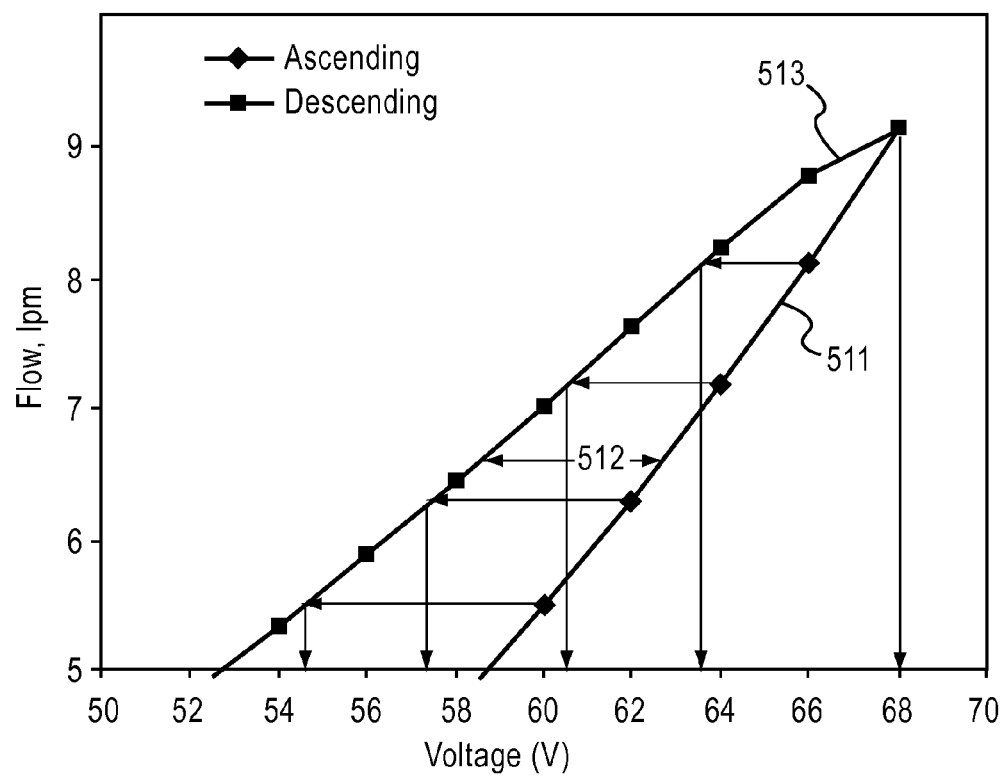
FIG. 5 is a graph showing flow as a function of voltage in accordance with an illustrative embodiment of the invention.

In one embodiment, determining the difference 312 between the input voltages for a desired output value such as a gas flow rate is determined through linear interpolation. For example, as shown in FIG. 5, a series of increasing and decreasing voltages are applied to a control valve 104 and the gas flow rate for each voltage is measured. Example values are given in Table 1:

TABLE 1

| Voltage (v) | Flow, lpm (ascending; approximate) | Flow, lpm (descending; approximate) | Change in voltage from turning point (v), |
|---|---|---|---|
| 54 | Not shown | 5.4 | 14 |
| 56 | Not shown | 5.9 | 12 |
| 58 | Not shown | 6.4 | 10 |
| 60 | 5.5 | 6.9 | 8 |
| 62 | 6.3 | 7.5 | 6 |
| 64 | 7.1 | 8.2 | 4 |
| 66 | 8.1 | 8.7 | 2 |
| 68 | 9.1 | 9.1 | 0 |

Using the table above, linear interpolation is implemented to determine an approximate descending voltage to apply to the control valve 104 along the second input signal range 513 in order to obtain a flow rate substantially equal to an ascending flow rate:

TABLE 2

| Flow, lpm (ascending; approximate) | Voltage, v (ascending) | Voltage, v (descending) | Distance from turning point ascending voltage, v | Ascending/ Descending Voltage Difference |
|---|---|---|---|---|
| 5.5 | 60 | 54.6 | 8 | 5.4 |
| 6.3 | 62 | 57.5 | 6 | 4.5 |
| 7.1 | 64 | 60.4 | 4 | 3.6 |
| 8.1 | 66 | 63.6 | 2 | 2.4 |
| 9.1 | 68 | 68 | 0 | 0 |

Table 2 also displays the difference 512 between the first input signal range 511 and the second input signal range 513 for each ascending flow value. The ascending/descending voltage difference shown above may also be referred to as a first voltage. Likewise, the first input signal range and second input signal range may be referred as ascending and descending voltage ranges, respectively. Also, the distance from turning point ascending voltage shown in Table 2 may also be referred to as an ascending voltage change. Again, a graphical display of the difference 512 as a function of the change in voltage from the first turning point 516 for the above values is shown in FIG. 4. In such a manner, hysteresis is characterized by the difference 512 to apply in order to obtain a similar flow rate along increasing and decreasing voltages.

Figure 6:
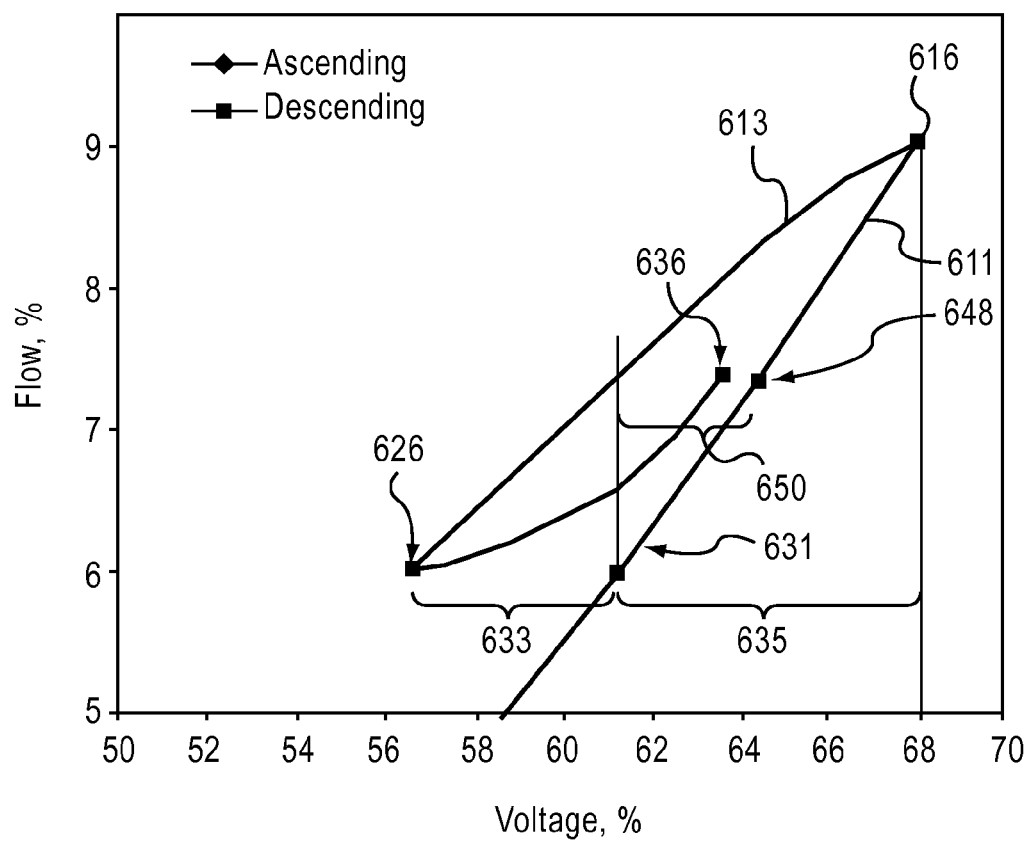
FIG. 6 is a graph showing the application of a method of operating a mass flow controller while compensating for hysteresis in accordance with an illustrative embodiment of the invention.

Characterizing hysteresis in this manner allows for a method of operating a mass flow controller, so that the voltage applied to the valve 104 may compensate for hysteresis. Shown in FIGS. 6 though 8 is one method of operating a mass flow controller valve 104. One method of operating a mass flow controller valve 104 involves sequentially applying a plurality of voltages to the valve 104. For example, as shown in FIG. 6, a first turning point 616, a second turning point 626, and a present voltage 636 may be applied in succession to the valve 102, each voltage being adapted to adjust the valve 102 in order to obtain a desired mass flow rates through the mass flow controller 100.

At least a portion of one of the plurality of voltages applied to the valve 104 comprises an adjusted voltage, also known as an adjusted final control signal 108. One example of an adjusted voltage is shown in FIG. 6 by the second turning point 626 voltage. For example, upon reaching the first turning point 616 corresponding to a flow of 9 lpm at 68 volts, a requested control signal 182 (as shown in FIG. 1) comprising a flow rate signal of 6 lpm is received by the control module 106. The second turning point 626 may be an adjusted voltage comprising the sum of a second turning point ascending voltage 631 (also known as an ascending control signal 184, as shown in FIG. 1) and a second turning point hysteresis adjustment voltage 633 (also known as a hysteresis adjustment signal, as shown in FIG. 1). In one embodiment, the ascending voltage 631 comprises a voltage along the first input signal range 611 which corresponds to the desired mass flow rate. The ascending voltage 631 is obtained through linear interpolation of the above Table 1, which shows that in order to obtain a desired flow rate of 6 lpm, a voltage of 61.5 v must be applied to the valve along the first input signal range 611. Other approximation formulas besides linear interpolation are contemplated.

Upon obtaining the ascending voltage 631, one can obtain a second turning point voltage change 635 (also known as a second voltage difference) by subtracting the ascending voltage 631, 61.5V, from the previous turning point's ascending voltage. In FIG. 6, the previous turning point is the first turning point 616. The first turning point's ascending voltage is equal to the first turning point voltage, or 68V, since the first turning point has no adjustment voltage included within the applied voltage. So, 61.5V is subtracted from 68V and a second turning point voltage change 635 of 6.5 v is obtained. Upon obtaining the voltage change 635 of 6.5 v, through use of linear interpolation of Table 2 (or other approximation formula), a second turning point adjustment voltage 633 (also known as a hysteresis adjustment voltage) of about 4.7V is obtained. Since the second turning point voltage is less than the first turning point voltage, the hysteresis adjustment voltage comprises a negative voltage of −4.7 v. Summing the feed forward voltage of 61.5 v with the hysteresis adjustment voltage of about −4.7 v provides an adjusted voltage of 56.8 v. Therefore, 56.8 v should be applied to the valve in order to obtain a desired mass flow rate of about 6 lpm after a first turning point of 68 v is reached.

A similar method is used to determine the present voltage 636 value. For example, upon applying the voltage of 56.8V in order to obtain a mass flow rate of 6 lpm, a mass flow rate of 7.4 lpm is desired. As previously shown in obtaining the second turning point voltage 626, a present ascending voltage 648 must first be obtained. Linear interpolation of Table 1 produces an output of about 64.6V for the present ascending voltage 648. Now, a present voltage change 650, which is the difference in voltage from the previous turning point ascending voltage to the present ascending voltage, is 64.6V-61.5V, which equals 3.1V. Using linear interpolation of Table 2 shows that a present voltage change 650 of 3.1V corresponds to a present hysteresis adjustment voltage of about 3.1. Summing the ascending voltage of 64.6 with the first turning point hysteresis adjustment voltage of −4.7 and a present hysteresis adjustment voltage of negative 3.1 leads to a total compensation voltage of −1.6, and an adjusted present voltage 636 of 63V. It is in this manner that future adjusted voltages are calculated—by taking into account each hysteresis adjustment voltage for each preceding turning point and the requested present voltage. Each turning point voltage value and hysteresis adjustment voltage value are stored in a memory device in sequential order. These values may then be accessible by a digital processor or other mechanism implementing software, hardware, or firmware in order to perform the above calculations.

Figure 8:
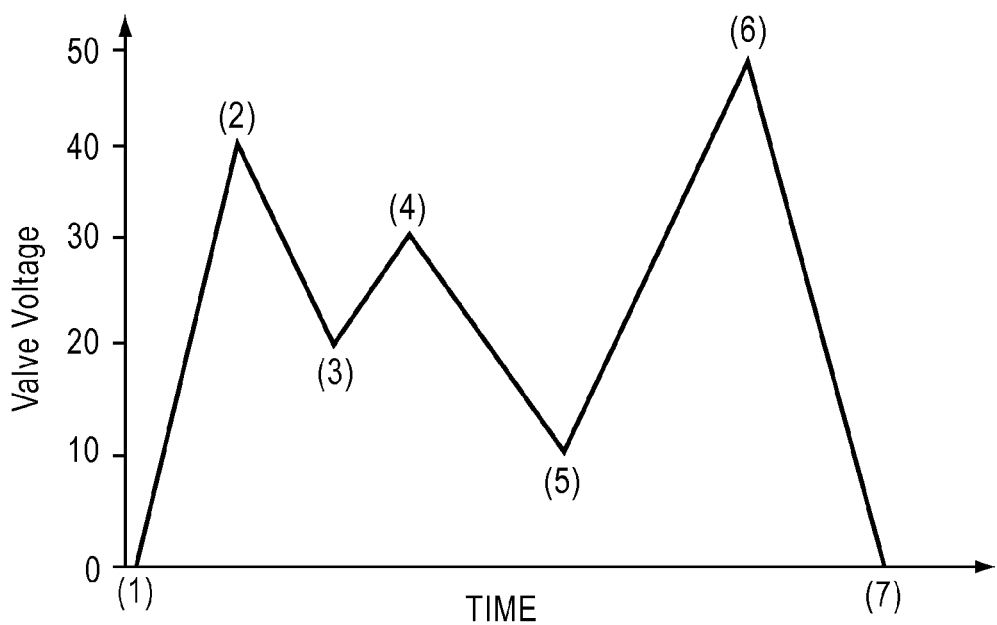
FIG. 8 is a graph comprising a series of voltages applied to a mass flow controller valve in accordance with an illustrative embodiment of the invention.

Various turning point voltage values 616, 626, voltage change values 635, 650, and corresponding hysteresis adjustment values are removed, or released from the memory device 103 and all subsequent adjusted voltage calculations during operation of the mass flow controller valve 102. For example, a two most recent voltages applied to the valve and the corresponding hysteresis adjustment voltages are removed from the memory device 103 when a present voltage is (i) decreasing and (ii) equal to or less than a second most recently applied and unreleased previous voltage. For example, shown in FIG. 8 is a representation of a series of sequentially applied voltages to a valve over time. As shown, the first five voltages applied to the valve are 0V, then 40V, then 20V, then 30V, and then 10V, respectively. As the voltage decreases from 30V to 10V, the present voltage becomes less than the second most recently applied and unreleased previous voltage, which is 20V. Therefore, the memory device removes the two most recently applied previous voltages (30V and 20V) and the corresponding hysteresis adjustment voltages from all subsequent adjusted voltage calculations.

Likewise, released from the memory device 103 are the two most recently applied and unreleased previous voltages when the present voltage is (i) increasing and (ii) equal to or greater than the second most recently applied and unreleased previously applied voltage. In the example shown in FIG. 8, as the voltage increases from 10V to 50V, the voltage passes the 40V mark. At this point, the second most recently applied and unreleased voltage is the second voltage applied, or 40V, since the 30V and 20V turning points were released. Therefore, the 10V and 40V turning points and corresponding hysteresis adjustment voltages are removed from all subsequent calculations since the present voltage is greater than the second 40V.

Furthermore, all voltages may be released from the memory device upon the present voltage comprising a zero voltage. Additionally, by implementing the above method(s) of operation, a gas may be adapted to flow through the MFC 100 with an actual flow rate that is within a 2 percent range of a desired mass flow rate.

Figure 7A:
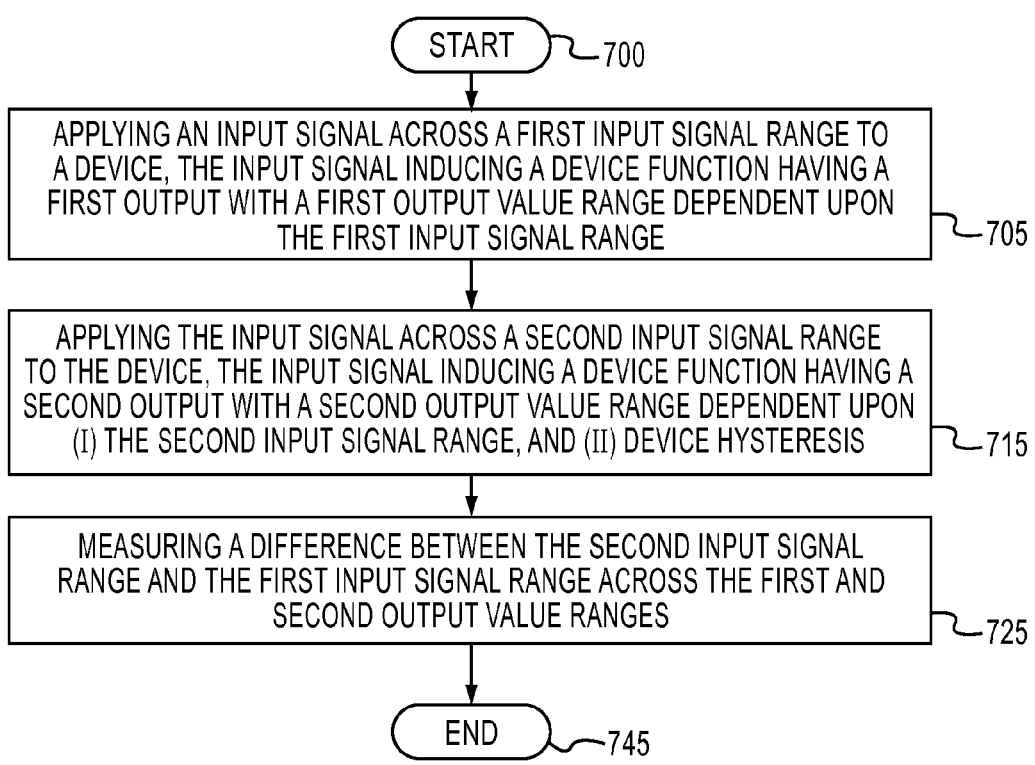
FIG. 7A is a flow chart comprising a method of characterizing hysteresis in accordance with an illustrative embodiment of the invention.

Embodiments of the invention described above are further provided for in FIGS. 7A and 7B. FIG. 7A is a representation of a method of characterizing hysteresis as a function of a device output. In 705, one embodiment of the method is shown to comprise applying an input signal across a first input signal range (e.g., input signal range 211, 311, 511). As shown in FIG. 7A, one input signal may induce a device function (such as, but not limited to, a control valve displacement) having a first output (such as gas flow) with a first output value range (e.g., first output value range 209, 309). One embodiment may comprise the first output value range 209, 309 dependent upon the first input signal range 211, 311, 511.

At 715, the input signal is applied across a second input signal range (e.g., the second input range 313, 513, as shown in FIGS. 3A and 5), to the device. The input signal induces the device to perform the device function, with the device having a second output with a second output value range (e.g., second output value range 307). The second output value range 307 in one method is dependent upon (i) the second input signal range 313, 513 and (ii) device hysteresis. Finally, at 725, a difference (e.g., difference 312, 512) between the second input signal range 313, 513 and the first input signal range 211, 311, 511 across the first and second output value ranges is measured.

Figure 7B:
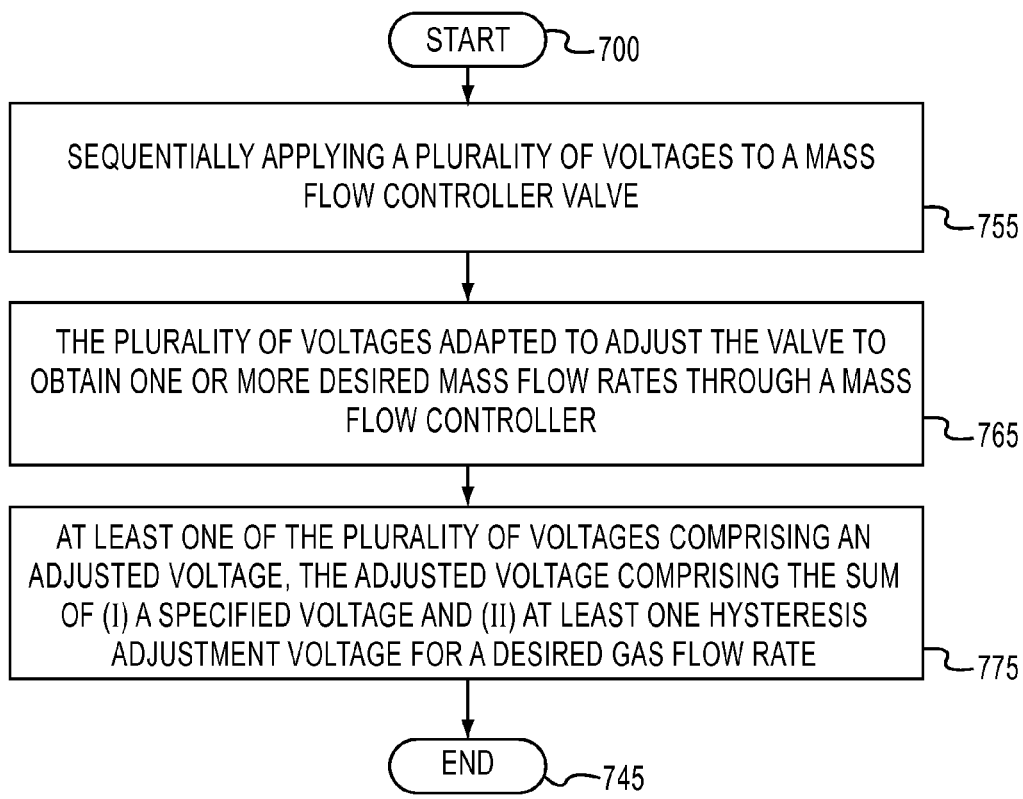
FIG. 7B is a flow chart comprising a method of operating a mass flow controller in accordance with an illustrative embodiment of the invention.

FIG. 7B is a representation of a method of operating a mass flow controller valve 104. At 755, one method comprises sequentially applying a plurality of voltages to the mass flow controller valve 104. At 765 it is seen that at least one of the plurality of voltages is adapted to adjust the valve 104 to obtain one or more desired mass flow rates through the mass flow controller 100. Furthermore, at 775, at least one of the plurality of voltages comprises an adjusted voltage comprising the sum of (i) a specified ascending voltage and (ii) at least one hysteresis adjustment voltage for a desired gas flow rate.

Similar methods may be applied to change the valve displacement in order to compensate for a change in gas pressure as opposed to changing valve displacement in order to adjust the flow rate. It is also contemplated that adjusting the valve displacement may be performed in order to compensate for both a changing pressure and a changing flow rate.

What is claimed is:

1. A mass flow controller comprising,
   a gas flow line;
   a control valve to control a flow rate of a gas flowing through the gas flow line;
   a control module that operates in feed forward mode, without input from a flow sensor, to apply a final control signal to the control valve by adjusting, when the control valve experiences hysteresis, an ascending control signal with a hysteresis adjustment signal to generate the final control signal, and when the control valve is not experiencing hysteresis, a particular ascending control signal value places the control valve at a particular valve displacement position and the control module does not adjust the ascending control signal;
   an ascending control component that produces the ascending control signal responsive to a currently requested flow rate utilizing ascending valve characterization data, the ascending valve characterization data relates control signal values to corresponding valve displacement positions when the control valve does not exhibit hysteresis;
   a hysteresis adjustment component that selects, based upon the currently requested flow rate and a history of prior requested flow values, at least one adjustment value from hysteretic characterization data, and the hysteresis adjustment component generates the hysteresis adjustment signal utilizing the at least one adjustment value; and a memory that includes the ascending valve characterization data that remains unchanged during operation, and the memory includes the hysteretic characterization data that remains unchanged during operation and includes adjustment values to characterize differences between the control signal values when the control valve does not exhibit hysteresis and control signal values when the valve experiences hysteresis.

2. The mass flow controller of claim 1 wherein, the control valve includes a piezoelectric actuator.

3. The mass flow controller of claim 1 wherein, the control module comprises at least one of a digital controller and a memory device.

4. The mass flow controller of claim 1 wherein,
the final control signal comprises a voltage; and
the hysteresis adjustment signal is a negative voltage when the ascending control signal needs to be reduced to generate the final control signal.

\* \* \* \* \*